Figures 1, 2, 3:
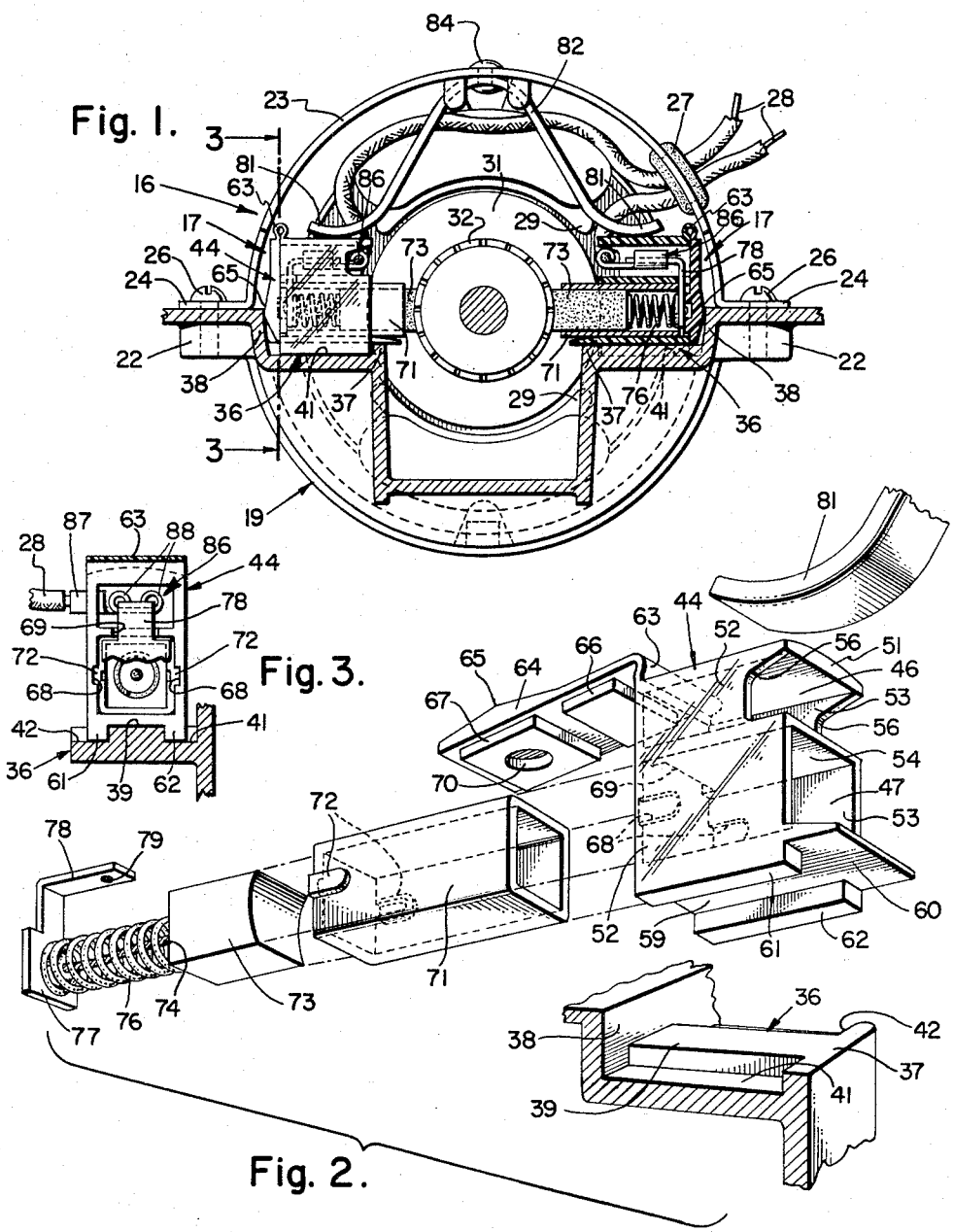

March 30, 1965  P. O. HUSTON  3,176,177

BRUSH HOLDER ASSEMBLY FOR ELECTRIC MOTORS

Filed March 8, 1963

INVENTOR.
PAUL O. HUSTON
BY
*Marshall J. Breen*
ATTORNEY

WITNESS
*Nicholas Leszczak*

United States Patent Office 3,176,177
Patented Mar. 30, 1965

3,176,177
BRUSH HOLDER ASSEMBLY FOR ELECTRIC MOTORS
Paul O. Huston, Bloomfield, N.J., assignor, by mesne assignments, to The Singer Company, New York, N.Y., a corporation of New Jersey
Filed Mar. 8, 1963, Ser. No. 263,851
16 Claims. (Cl. 310—247)

This invention relates to electric motors of the type having an armature provided with a commutator and more particularly to means for supporting or mounting carbon brushes so that they will properly engage the commutator, and the primary object of the present invention is to provide an improved device of this character.

Another object of the invention is to provide an improved brush support that will be inexpensive to manufacture as well as easy to install and service.

A further object of the invention is to provide an improved means for mounting and clamping a brush holder in the frame of an electric motor.

Another object of the invention is to provide an improved brush holder of which a part thereof is formed as an integral plastic unit.

A still further object of the invention is to provide an improved end closure or cover for closing one end of a plastic brush holder.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings:

FIG. 1 is a transverse sectional view taken through an electric motor equipped with a brush support embodying the present invention, FIG. 2 is an exploded enlarged perspective view of one of the brush supports shown in FIG. 1, and FIG. 3 is a view taken substantially on the line 3—3 of FIG. 1.

FIGS. 1 through 3 illustrate the preferred form of the present invention, wherein an electric motor 16 is shown equipped with a set of brush supports 17. The shell of the motor 16 is of the split frame type and includes, among other items, a lower metallic half-frame 19 from opposite sides of which extend a pair of diametrical members 22. The lower half-frame 19 is covered by a preferably metallic upper half-frame 23 having diametrical lugs 24 which are held to the members 22 by screws 26. The upper half-frame 23 is apertured to accommodate a grommet 27 through which extends lead wires 28. The motor 16 also includes stator laminations having a pair of field poles 29 and an armature 31 having a commutator 32, the armature 31 being rotatably journaled in bearings (not shown).

The lower half-frame 19 is formed with a set of up-facing identical but opposite-hand shelves 36, each shelf 36 being limited by an inner abutment wall 37, and outer abutment wall 38, and a connecting bar 39. Because the bar 39 extends a shorter distance axially of the motor 16 than the walls 37 and 38, there is formed a pair of depressions or wells 41 and 42. Also the wall 38 extends above the shell 36 and the wall 37 extends below the surface of the connecting bar portion 39 of the shelf 36.

Each shelf 36 supports a unitary brush holder 44, preferably made of plastic and in the form of a box having two rectangular cavities 46 and 47. The cavity 46 has one open end and is bounded by a top wall 51, two side walls 52 and 53, and a partition wall 54. Each of the walls 52 and 53, adjacent to the open end of the cavity 46, is cut away as at 56 to thereby cause the wall 51 to overhang the wall 54. The cavity 47 has one open end and is bounded by the partition 54, extensions of the two side walls 52 and 53 and a bottom wall 59 having an extension 60. The lower surface of the bottom wall 59 has formed integrally therewith a pair of preferably rectangular protrusions or ribs 61 and 62 which are respectively received into the aforementioned wells 41 and 42 when the brush holder 44 rests on the shelf 36. The end of the wall 51 remote from the overhang caused by cut-aways 56—56 is formed with a plastic hinge 63 which is integral with and hingedly supports a plastic lid or cover 64. The outside surface of the cover 64 is formed with a cam surface 65, and the inside surface of the cover 64 carries a pair of raised, preferably rectangular blocks 66 and 67, which respectively fit into the cavities 46 and 47. The inside surfaces of the side walls 52 and 53, adjacent to the end of the cavity 47 closed by the block 67, are each formed with a recess 68, and the end of the partition wall 54, adjacent to the end of the cavity 47 closed by the cover 64, is formed with a notch opening 69, the inner surface of the block 67 is provided with a depression 70.

When the brush supports 17—17 are assembled and in use, the cavity 47 houses a rectangular metallic brush tube 71, the tube 71 having on two opposed sides, a lug 72 of such size, position and shape as to fit into the recesses 68. Also the brush tube 71 houses a conventional carbon brush 73 which is equipped with a conventional pig tail 74 and brush spring 76. The free end of the pig tail 74 is connected to a square metallic plate 77 from one edge of which extends one arm of an L-shaped connector lug 78. The end of the other arm of the L-shaped lug 78 is formed with a hole 79. As best shown in FIGS. 1 and 3, the lead wire 28 is detachably connected to the lug 78 by means of a conventional connector 86, having ends 87 and 88 which connection may be similar to the "187 SERIES FASTON® RECEPTACLES–FLAG" connector shown on page 15 of the catalogue titled "THE AMP® FASTON® LINE, AMP INCORPORATED/HARRISBURG, PA." The end 87 of the connector 86 conductively embraces the end of the lead 28 and the other end 88 of the connector 86 has a pair of resilient curved arms which slidably engage the end of the lug 78. A protuberance (not shown) may be formed on the end 88 in such a manner as to engage the hole 79 formed in the lug 78.

When the brush support is fully assembled and in place, the ribs 61 and 62 enter the wells 41 and 42 and the bottom surface of the wall 59 rests on the top of the bar 39. The extension 60 rests on and extends beyond the top of the inner wall 37 and the ends of the ribs 61 and 62 engage the inner wall 37 but do not engage the outer wall 38. Also the brush tube 71 is received into the cavity 47 with the lugs 72—72 entering the recesses 68—68. The brush 73, the pig tail 74, the spring 76, and the plate 77 enter the cavity 47, the plate 77 acting as a cap or closure for one end of the tube 71, whereas the arm of the lug 78 which extends outwardly in the plane of the plate 77 passes through the notch opening 69 so that the leg having the hole 79 extends longitudinally of the cavity 46, and as best seen in FIG. 1, the lead wires 28 are connected to the lugs 78. When the two brush holders 44—44 are seated on the two shelves 36—36, and the upper half-frame 23 is held in place by the screws 26—26, the said brush holders 44—44 are held in place by opposite ends 81—81 of a bow shaped spring 82, the central portion of the spring 82 being secured to the inner surface of the upper half frame 23 by a rivet 84. The cut aways 56—56 of the walls 52 and 53 provide access to the end of the lug 78 which carries the hole 79. When in use, the cover 64 is hinged to the position shown in FIG. 1, and the brush holder 44 is placed between the walls 37 and 38, it being noted that the cam surface 65 wedges the brush holder 44 in place, and at the same time, holds the cover 64 closed.

In use, the brush holder 44 is installed on the shelf 36 in the following manner. First, the brush tube 71 is inserted into the cavity 47 in such a manner that the lugs 72—72 enter recesses 68—68. Then the brush 73 is inserted into the brush tube 71 until the spring 76, the pig tail 74 and the plate 77 are housed within the tube 71 and the cavity 47. This causes one arm of the L-shaped lug 78 to pass through the notch 69 so that the other leg of the lug 78 extends longitudinally of the cavity 46. Next, the cover 64 is turned on the hinge 63 until the blocks 66 and 67 respectively enter the cavities 46 and 47. After this, the spring 76 is compressed by pushing the brush 73 into the cavity 47 in a direction toward the cover 64. Then the brush holder 44 is placed on the shelf 36 in such a manner that the bottom of the wall 60 rests on top of the bar 39 and the ribs 61 and 62 respectively enter the cavities 41 and 42. Because of the spring 76, the cam surface 65 will be forced against the inner surface of the wall 38. This holds the brush holder 44 in place until such time as the upper half-frame 23 is in place and the spring 82 functions to press the brush holders 44—44 against the shelves 36—36.

Having thus set forth the nature of the invention, what is claimed herein is:

1. A brush support for electric motors of the type having a frame, an armature provided with a commutator, and a carbon brush engaging said commutator, said brush support having an upstanding member and two spaced wells formed adjacent to said upstanding member; an insulating brush holder resting on said upstanding member and having a pair of spaced protuberances entering said wells; and means engaging said brush holder for pressing said brush holder against said upstanding member and for holding said protuberances in said wells.

2. A brush support for electric motors of the type having a frame, an armature provided with a commutator, and a carbon brush engaging said commutator, said brush support comprising a shelf formed on said frame and said shelf being provided with a depression formed with spaced end walls; an insulating brush holder seated on said shelf; a protuberance on said brush holder entering said depression with one end of said protuberance engaging one of said end walls; and means engaging said brush holder for pressing said brush holder against said shelf.

3. A brush support for electric motors of the type having a frame, an armature provided with a commutator, and a carbon brush engaging said commutator, said brush support comprising a shelf formed on said frame and said shelf being provided with a depression formed with spaced end walls, one of said end walls extending above said shelf; an insulating brush holder loosely placed on said shelf and having a protuberance entering said depression and engaging one of said walls and one end of said brush holder engaging the other end wall; and means engaging said brush holder for pressing said brush holder against said shelf.

4. A brush support for an electric motor comprising in combination a shelf formed as part of said motor, said shelf having at least one bar and at least one well; a plastic brush holder; a bottom wall formed as part of said brush holder, the outer surface of said bottom wall engaging said bar; a rib protruding from said bottom wall and designed to enter said well; a pair of side walls; a partition wall; a top wall, said side walls, partition wall and top wall defining with said bottom wall a pair of rectangular cavities, and said partition wall being formed with a notch communicating with both of said cavities; a plastic cover hinged to one end of one of said walls and carrying a pair of rectangular blocks designed to enter the ends of said cavities; a metallic brush tube fitted into one of said cavities; a carbon brush slidably fitted into said brush tube; a pig tail and spring connected to one end of said brush; a metallic plate and L-shaped lug connected to the other end of said pig tail and spring, said plate entering one of said cavities and said lug passing through the notch opening in said partition wall and a portion of said lug entering said other cavity; and a bow spring designed to be carried by said electric motor and pressing against the top wall of said brush holder to thereby hold the bottom wall of said brush holder against said bar, and to hold said rib into said well.

5. An insulating plastic brush holder for use with electric motors, said brush holder comprising a bottom wall, a pair of side walls, and a top wall, said walls defining a cavity; a plastic hinge formed on one end of one of said walls; and a plastic cover connected to said hinge and designed to close one end of said cavity.

6. An insulating plastic brush holder according to claim 5, wherein the inner surface of said cover carries a rectangular block designed to enter one end of said cavity.

7. An insulating plastic brush holder according to claim 5, wherein the external surface of said cover carries a cam surface.

8. An insulating plastic brush holder for use with electric motors, said brush holder comprising a bottom wall; a pair of side walls; a top wall; a partition wall, said partition wall dividing said brush holder into two cavities; a plastic hinge formed on one end of one of said walls; and a plastic cover connected to said hinge, and designed to close at least one of said cavities.

9. An insulating plastic brush holder for use with electric motors, said brush holder comprising a bottom wall; a pair of side walls; a top wall; a partition wall, said partition wall dividing said brush holder into two cavities and said partition wall being formed with a notch communicating with said two cavities; a metallic brush tube fitted into one of said cavities; a carbon brush slidably mounted in one of said cavities; a pig tail and spring connected at one end to said brush, and housed in the cavity with said brush; and a metallic plate having an L-shaped lug connected to the other end of said pig tail and spring, said plate entering one of said cavities and said lug passing through said notch and a portion of said lug entering said other cavity.

10. An insulating plastic brush holder in accordance with claim 9, wherein an insulating cover is hinged to one end of one of said walls, said cover closing one end of at least one of said cavities.

11. A brush support for electric motors of the type having a frame, an armature provided with a commutator, and a carbon brush engaging said commutator, said brush support having a shelf, an inner abutment wall formed adjacent to one end of said shelf, an outer abutment wall formed adjacent to the other end of said shelf, an insulating brush holder resting on said shelf and having one of its ends engaging said inner abutment wall and having its other end engaging said outer abutment wall; and means for holding said brush holder on said shelf.

12. A brush holder support according to claim 11 in which one end of said insulating brush holder is formed with a hinged cover, which cover when in closed position, engages one of said abutment walls.

13. A brush holder support according to claim 12 in which the outer surface of the hinged cover is provided with a cam surface adapted to engage one of the abutment walls.

14. A brush holder support according to claim 11 in which one of said abutment walls extends above said shelf and in which the other abutment wall extends below a portion of said shelf.

15. A brush assembly for electric motors of the type having a frame provided with a brush assembly receiving cavity defined by a front abutment wall and an opposed rear abutment wall, said brush assembly including a carbon brush adapted to engage said commutator, and a hollow unitary plastic housing enclosing said carbon brush with the carbon brush projecting from that end of the housing which is adapted to abut against the front abutment wall of said brush assembly receiving cavity, a cover closing that end of the housing remote from the end from which the carbon brush projects, said housing and its cover having an assembled size in length slightly larger than the distance between the opposed front and rear abutment walls of said brush assembly receiving cavity such that when the brush assembly is pressed into the cavity the unitary plastic housing and its cover is compressed between the opposed front and rear abutment walls, and current carrying means connected to said carbon brush and extending externally of said housing.

16. A brush assembly constructed in accordance with claim 15 wherein the cover of said plastic housing is joined to the main portion of said housing by an integral plastic hinge.

No references cited.

MILTON O. HIRSHFIELD, *Primary Examiner*.